(12) United States Patent
Shinomiya

(10) Patent No.: US 7,639,615 B2
(45) Date of Patent: Dec. 29, 2009

(54) COMMUNICATION PATH RESTORATION METHOD BASED ON PREPLANNED NETWORK NOTE CONFIGURATION

(75) Inventor: Norihiko Shinomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 731 days.

(21) Appl. No.: 10/789,594

(22) Filed: Feb. 27, 2004

(65) Prior Publication Data
US 2004/0196783 A1 Oct. 7, 2004

(30) Foreign Application Priority Data
Apr. 1, 2003 (JP) ............... 2003-098198

(51) Int. Cl.
H04L 1/00 (2006.01)
H04L 12/26 (2006.01)
H04L 12/28 (2006.01)
H04L 12/16 (2006.01)
H04L 11/00 (2006.01)
G06F 15/173 (2006.01)

(52) U.S. Cl. ............ 370/235; 370/230; 370/231; 370/229; 709/239

(58) Field of Classification Search ........... 714/43; 709/239, 238, 230, 233, 243; 370/225, 229, 370/230, 230.1, 231, 232, 233, 234, 235, 370/235.1, 236, 236.1, 236.2, 237, 238, 238.1, 370/239, 240
See application file for complete search history.

(56) References Cited

U.S. PATENT DOCUMENTS 7,188,280 B2 * 3/2007 Shinomiya et al. ............ 714/43

2002/0138645 A1 * 9/2002 Shinomiya et al. .......... 709/238

FOREIGN PATENT DOCUMENTS

| JP | 3-241938 | 10/1991 |
|----|----------|---------|
| JP | 2000-324167 | 11/2000 |
| JP | 2002-077244 | 3/2002 |
| JP | 2002-164893 | 6/2002 |
| JP | 2002-281068 | 9/2002 |

OTHER PUBLICATIONS

Yasuki Fuji et al. [Translation], "A Study on Path Restoration Method Based on Pre-Planned Configuration", Nov. 2000, IECE, pp. 67-72.*
Fujii, Y, "Management of WDM self-healing networks", Jun. 1999, ICC '99 IEEE Internation Conference on Communications, vol. 2, pp. 1028-1033.*
Yasuki Fujii, et al. A Study on Path Restoration Method Based on Pre-planned Configuration, IEICE pp. 67-72.
Notice of Rejection mailed Jun. 26, 2007, from the corresponding Japanese Application.

* cited by examiner

Primary Examiner—Steven H Nguyen
Assistant Examiner—Adam Duda
(74) Attorney, Agent, or Firm—Katten Muchin Rosenman LLP

(57) ABSTRACT

A failure detected network node, which detects a network failure that is assumed to occur at a location in a current communication path through network nodes, is determined. A failure notification time for each network node is then calculated. After that, a first network node is selected from the network nodes, based on the failure notification time. The first network node is positioned in the current communication path on upper stream from the location of the network failure. Finally, an alternative communication path, which includes the first network node and a second network node out of the network nodes, is determined. The second network node is positioned in the current communication path on down stream from the location of the network failure.

18 Claims, 17 Drawing Sheets

○ : NETWORK NODES N1 TO Nx

FIG.3

| FAILURE PORTION FAILURE CURRENT | COMMUNICATION PATH (NODE SERIES) | ALTERNATIVE COMMUNICATION PATH (NODE SERIES) | FAILURE DETECTED COMMUNICATION NODE |
|---|---|---|---|
| LINK L1 (BETWEEN N1 AND N2) | WP1 (N1, N2) | SP1 (N1, N4, N5, N2) | N2 |
| | WP2 (N1, N2, N3, N6) | SP2 (N1, N4, N5, N6) | N2 |
| | WP3 (N1, N2, N5, N8) | SP3 (N1, N4, N7, N8) | N2 |
| | WP4 (N9, N6, N3, N2, N1) | SP4 (N9, N8, N7, N4, N1) | N1 |
| | WP5 (N2, N1, N4) | SP5 (N2, N5, N4) | N1 |
| | ... | ... | ... |
| LINK L2 (BETWEEN L2 AND N3) | | | |

| NETWORK NODE | LATI-TUDE | LONGI-TUDE |
|---|---|---|
| N1 | 41.10 | - 81.50 |
| N2 | 33.72 | - 117.90 |
| ... | ... | ... |
| Nx | 47.62 | - 89.97 |

111B

| LINK | NETWORK NODE | NETWORK NODE | LENGTH (km) |
|---|---|---|---|
| L1 | N1 | N2 | 331 |
| L2 | N3 | N5 | 185 |
| ... | ... | ... | ... |
| Lx | N10 | N12 | 169 |

| CURRENT COMMUNICATION PATH | STARTING POINT NETWORK NODE | END POINT NETWORK NODE | ROUTE NETWORK NODE SERIES | NUMBER OF CHANNELS |
|---|---|---|---|---|
| W P1 | N1 | N3 | N2 | 1 |
| W P2 | N2 | N5 | N1、N2、N3、N6 | 2 |
| ... | ... | ... | N1、N2、N5、N8 | ... |
| W Px | N10 | N13 | N9、N6、N3、N2、N1 | 1 |

○ : NETWORK NODES N1 TO Nx

COMMUNICATION PATH RESTORATION METHOD BASED ON PREPLANNED NETWORK NOTE CONFIGURATION

BACKGROUND OF THE INVENTION

1) Field of the Invention

The present invention relates to an alternative communication path design in a switching destination at the time of occurrence of a failure in a communication path. More particularly, the invention relates to a method of and apparatus for determining an alternative communication path, which can shorten a recovery time of the communication path at the time of the occurrence of a failure more realistically.

2) Description of the Related Art

According to diversification of service and demand expansion in Internet, a communication traffic volume in backbone networks is increasing remarkably. For this reason, in backbone networks, a capacity is being enlarged and a speed is being heightened based on wavelength division multiplexing (WDM) technique.

In order to realize flexible control of a mesh type network and an efficient operation due to sharing of an auxiliary wavelength, optical cross connect (OXC) and optical add-drop multiplexer (OADM) are being developed. A new communication infrastructure and introduction of its service are expected.

In large-capacity WDM networks, as a number of services in a system become larger, damage due to the occurrence of a failure is more extensive. For this reason, development of advanced management systems which heightens reliability of the networks is an issue. Particularly techniques to which recover services quickly from link failures and network node failures using optical layers are important.

The inventors of the present invention are examining a preplan type failure recovery system which realizes quick recovery from failures in the WDM networks (see "A Study on Path Restoration Method Based on Pre-planned Configuration" by Yasuki FUJII, Keiji MIYAZAKI and Khohei ISEDA, "Technical Report of IEICE" TM2000-60, pp. 67 to 72, November 2000).

In the preplan type failure recovery system, failure information is posted from network nodes that detect a failure to adjacent network nodes successively in network nodes where alternative communication path information is preset (flooding). As a result, the network nodes switch the communication paths in parallel according to the set alternative communication path information. As a result, the time required for dynamically searching for an alternative communication path can be shortened, and thus high-speed service recovery can be expected.

Even if the parallel switching of the communication paths is enabled, however, when the time until the network node on the alternative communication path to be switched receives the post of a failure is long, the high-speed service recovery cannot be realized.

FIG. 19 is a diagram explaining the above conventional preplan type failure recovery system. The drawing illustrates a network which is based on an optical path where an optical signal is transmitted/received between terminal stations, and particularly illustrates the network using optical cross connect (OXC) for relay, in which a plurality of optical signals are multiplexed in an optical fiber using the WDM technique.

In FIG. 19, it is supposed that communication is carried out on a current communication path WP1 of network nodes 17, 10, 12 and 14 from a network node 1 to a network node 2. If a failure 11 occurs between the network nodes 10 and 12, for example, the network node 12 on a lower stream side detects the failure. Each network node includes an optical cross connect as an optical switch.

The optical cross connect has a function of adjusting an angle of a built-in mirror (not illustrated) so as to switch a connecting state between a port on an optical signal input section and a port on an optical signal output section.

The network node 12 which detects the failure transfers a failure notification message 13 including failure location information to the (adjacent) network node 14. The (adjacent) network node 14 further posts the message 13 to the (adjacent) network node 15. In such a manner, the message 13 is posted to the adjacent network nodes successively (flooding).

The (alternative communication path relay) network nodes 15 and 16 and the (communication path switching) network nodes 14 and 17 transfer the failure notification message to all the adjacent network nodes excluding the network nodes which receive the message only when they receive the failure notification message at the first time.

The communication path is switched from the current communication path WP1 into an alternative communication path SP1 according to the preset alternative communication path information.

When the alternative communication path relay network node or the communication path switching network node on the set alternative communication path is separated from the failure detected network node and thus takes a long time until reception of the failure notification message, this is a major factor in a delay of the communication path recovery.

In the prior art, therefore, an alternative communication path, where the time required for transferring the failure notification message from the network node which detects the failure to all the network nodes on the alternative communication path does not exceed a given upper limit time, is pre-searched at the time of designing the alternative communication path, and this alternative communication path is set in the network nodes (see Japanese Patent Application Laid-Open Nos. H3-241938, 2002-77244, and 2002-281068).

In the prior art, when a failure occurs, the communication path is switched from a current communication path into an alternative communication path, but the recovery of the communication path is occasionally delayed depending on selection of a switching network node on an upper stream side with respect to a failure location on the current communication path.

That is to say, the network node where the communication path is switched requires an initial setting step of adjusting an angle of the mirror roughly as initial setting, and a finely adjusting step of finely adjusting the angle of the mirror so that an input of an optical signal is received from the upper stream and the output becomes normal. When these steps are not successively executed from the switching network node on the upper stream side to the switching network node on the lower stream side on the alternative communication path, the alternative communication path is not opened to traffic.

How quickly the switching network node on the upper stream side is switched is, therefore, important to shortening of the recovery time.

In the prior art, however, the alternative communication path, where the time for transferring the failure notification message from the failure detected network node does not exceed the given upper limit time, is set in the network nodes. Since the switching network node on the upper stream side is not, however, always switched in the quickest manner, the recovery of the communication path is occasionally delayed.

SUMMARY OF THE INVENTION

It is an object of the present invention to at least solve the problems in the conventional technology.

A method of determining an alternative communication path in a communication network built with a plurality of network nodes according to one aspect of the present invention includes assuming that a network failure occurs at a location in a current communication path through the network nodes; and determining a failure detected network node that detects the network failure, out of the network nodes; and calculating a failure notification time for each network node. The failure notification time indicates a time from when a failure notification message is transmitted by the failure detected network node until the each network node receives the failure notification message. The method also includes selecting a first network node out of the network nodes based on the failure notification time. The first network node is positioned in the current communication path on upper stream from the location of the network failure. The method further includes determining an alternative communication path that includes the first network node and a second network node out of the network nodes. The second network node is positioned in the current communication path on down stream from the location of the network failure.

An apparatus for determining an alternative communication path in a communication network built with a plurality of network nodes according to another aspect of the present invention includes a node selecting unit and a path searching unit. The node selecting unit determines a failure detected network node that detects a network failure that is assumed to occur at a location in a current communication path through the network nodes, out of the network nodes. The node selecting unit also calculates a failure notification time for each network node. The failure notification time indicates a time from when a failure notification message is transmitted by the failure detected network node until the each network node receives the failure notification message. The node selecting unit also selects a first network node out of the network nodes based on the failure notification time. The first network node is positioned in the current communication path on upper stream from the location of the network failure. The path searching unit determines an alternative communication path that includes the first network node and a second network node out of the network nodes. The second network node is positioned in the current communication path on down stream from the location of the network failure.

The computer program product according to still another aspect of the present invention realizes the method according to the present invention on a computer.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 3 illustrates one example of an alternative communication path table TB illustrated in FIG. 2;

FIG. 5 illustrates topological information 111 illustrated in FIG. 4;

FIG. 6 illustrates current communication path information illustrated in FIG. 4;

DETAILED DESCRIPTION

Exemplary embodiments of an alternative communication path designing method according to the present invention is explained in detail with reference to the accompanying drawings.

Figure 1:
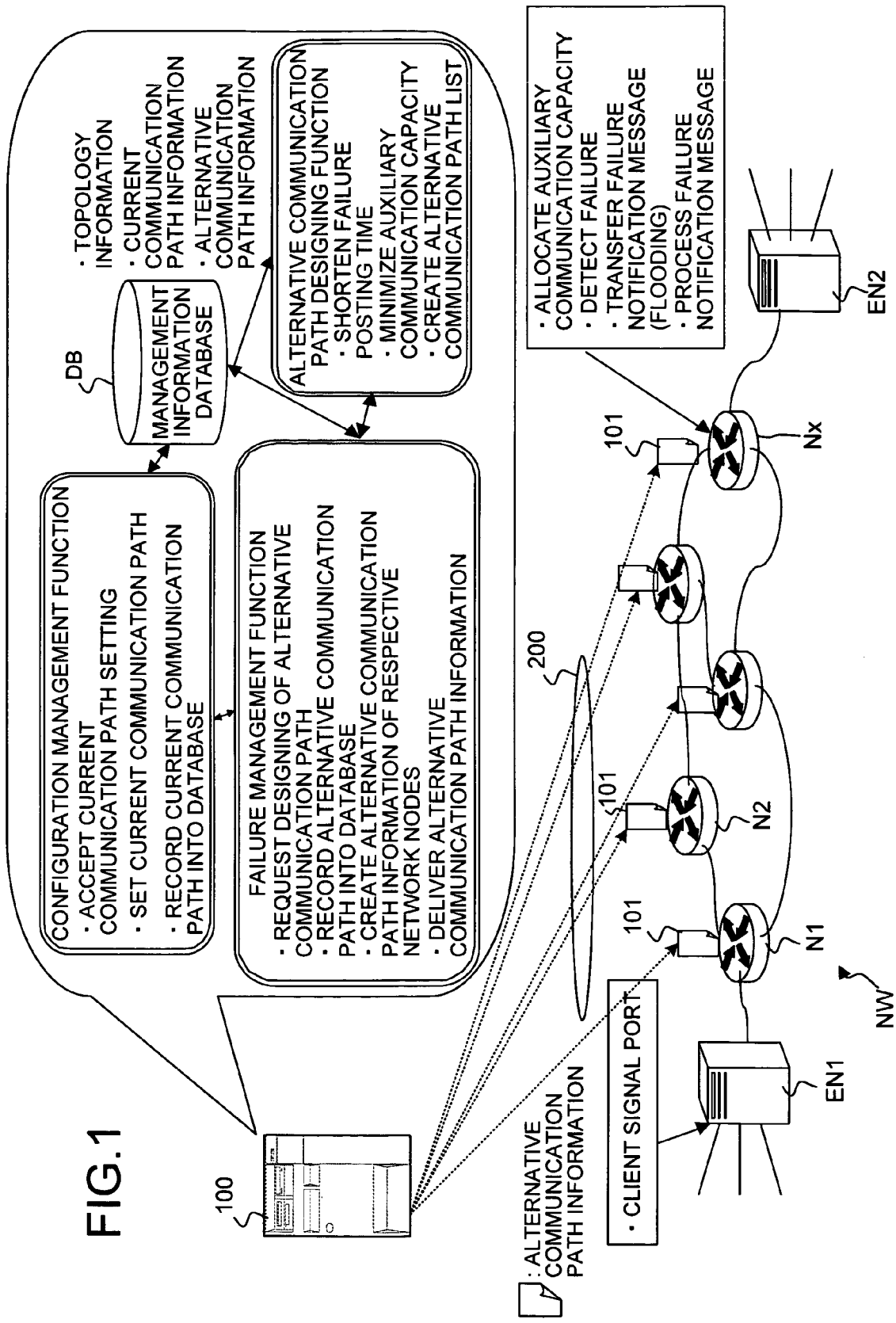
FIG. 1 illustrates a schematic configuration according to one embodiment of the present invention.

FIG. 1 is a block diagram illustrating a schematic configuration according to one embodiment of the present invention. The drawing illustrates an optical communication network NW to which the alternative communication path designing method is applied, and a network management system (NMS) 100 which configures the optical communication network NW and manages its failure.

The optical communication network NW is configured by interconnecting a plurality (x) of network nodes N1 to Nx, and it is connected with another network (not illustrated) via edge network nodes EN1 and EN2 as ports of a client signal. Each of the network nodes N1 to Nx is configured by the above-mentioned optical cross connect. They allocate an auxiliary communication capacity (resource), detect a failure, transfer a failure notification message (flooding), analyze the failure notification message, and the like.

The network management system 100 is connected with the network nodes N1 to Nx via an exclusive network 200 to be used for failure management, and has a configuration management function, a failure management function, and an alternative communication path designing function in the optical communication network NW.

The network management system 100 stores information necessary for the functions into a management information database DB. In the configuration management function, a request for setting a current communication path is accepted, and the current communication path is set based on topologic information representing topology of the optical communication network NW (a form of the network expressed by a network node and a link), and the current communication path information is stored into the management information database DB.

In the failure management function, design of an alternative communication path for the current communication path stored in the management information database DB is requested, and the obtained alternative communication path is stored into the management information database DB. Further, in the failure management function, alternative communication path information 101 is created, and is delivered to the network nodes N1 to Nx via the exclusive network 200.

In the alternative communication path designing function, the alternative communication path is designed based on a user's setting request, and the failure posting time is shortened and a total auxiliary communication capacity (resource) is minimized by the request.

The network nodes N1 to Nx on the optical communication network NW store the delivered alternative communication path information into an alternative communication path information table, mentioned later, and allocate the auxiliary communication capacity (resource). When a failure occurs on the optical communication network NW, the network nodes detect the failure and transfer (flooding) a failure notification message.

Figure 2:
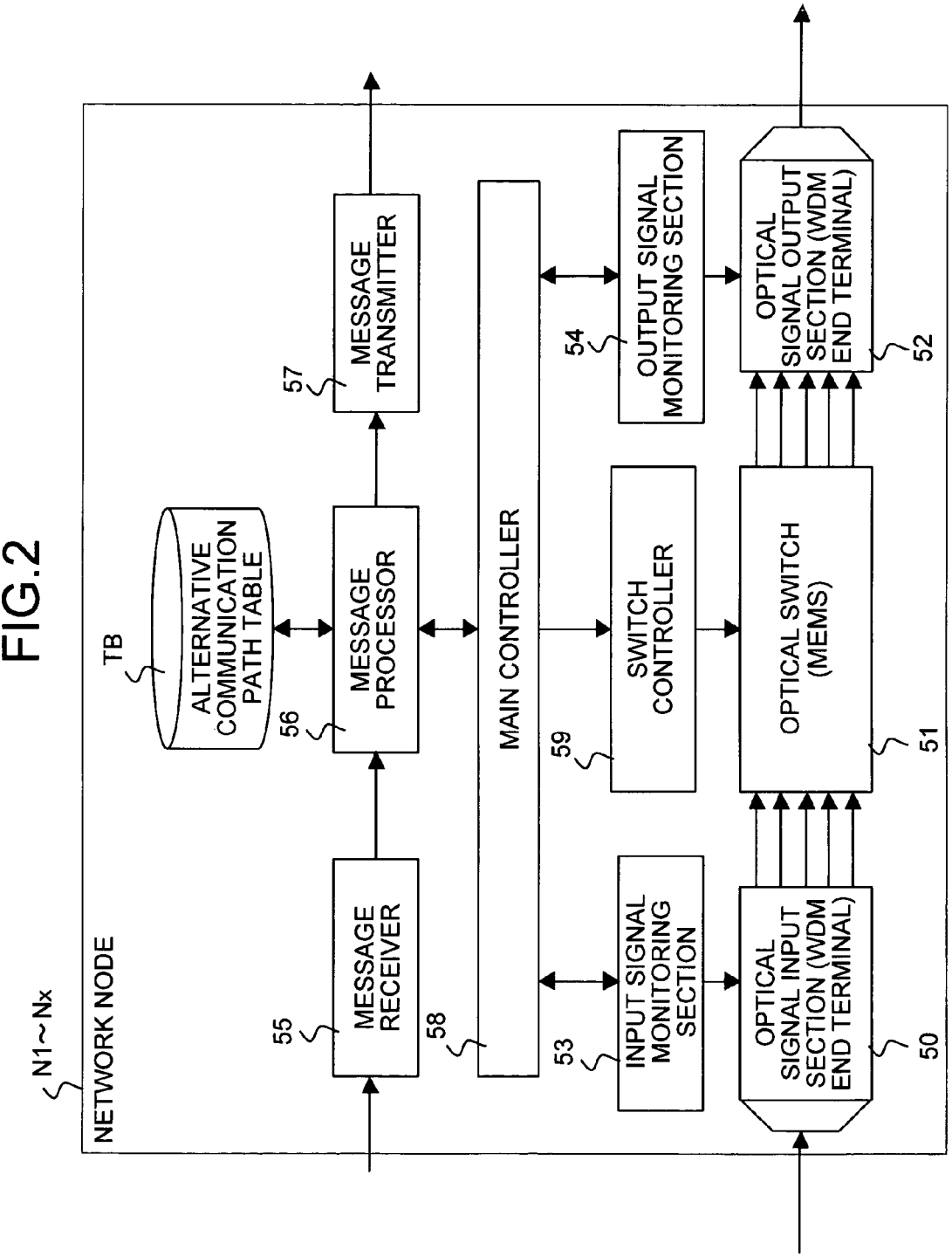
FIG. 2 is a block diagram illustrating a configuration of network nodes N1 to Nx illustrated in FIG. 1.

FIG. 2 is a block diagram illustrating a configuration of the network nodes N1 to Nx illustrated in FIG. 1. In the drawing, an optical signal input section 50 terminates one or plural transmission media or medium (for example, an optical fiber) configuring a link connected to a self network node by means of WDM. The optical signal input section 50 receives various optical signals input via the communication paths included in the terminated link.

An optical switch 51 is a switch utilizing a micro electro-mechanical system (MEMS), and switches a connecting state between ports on the optical signal input section 50 and ports on an optical signal output section 52 by adjusting an angle (MEMS angle) of a built-in mirror (not illustrated). Channel numbers which are not overlapped with each other in the network node are allocated to the ports of the optical signal input section 50 and the ports of the optical signal output section 52.

The optical signal output section 52 terminates one or plural transmission media or medium configuring the link connected with the self network node, and outputs various optical signals to the communication paths included in the terminated link.

An input side signal monitoring section 53 is provided so as to be related with the optical signal input section 50, and monitors an optical signal input into the optical signal input section 50, so as to post quality of the optical signal to a main controller 58, mentioned later.

An output side signal monitoring section 54 is provided so as to be related with the optical signal output section 52, and monitors an optical signal output from the optical signal output section 52, so as to post quality of the optical signal to the main controller 58.

A message receiver 55 receives a failure notification message transmitted from an adjacent network node. The failure notification message includes failure location information for specifying a link where the failure has occurred.

A message processor 56 holds the failure notification message received by the message receiver 55. When the same kind of failure notification messages are transmitted from different network nodes, the message processor 56 holds only the failure notification message received at the first time.

The message processor 56 searches the held failure notification messages, so as to determine whether a failure notification message newly received by the message receiver 55 is overlapped with the already received failure notification messages. That is to say, the message processor 56 determines whether the failure notification message received by the message receiver 55 is a new failure notification message.

When the failure notification message received by the message receiver 55 is a new failure notification message, the message processor 56 instructs a message transmitter 57 to transmit the failure notification message. The message transmitter 57 transmits the failure notification message to an adjacent network node based on the instruction from the message processor 56.

The message processor 56 gives the instruction to the message transmitter 57, and refers to the alternative communication path table TB so as to instruct the main controller 58 to switch the communication path.

The alternative communication path table TB stores the alternative communication path information 101 delivered from the network management system 100 illustrated in FIG. 1 thereinto. The alternative communication path table TB has, as illustrated in FIG. 3, fields for a failure location, a failure current communication path, an alternative communication path, and a failure detected network node.

The failure location is a location where a failure occurs in the optical communication network NW (see FIG. 1), and it is expressed by the link (between the network nodes). For example, in the link L1 (between N1 and N2), a failure occurs between the network nodes N1 and N2.

In the failure current communication path, the current communication path including the failure location is expressed by a network node series. For example, the WP1 (N1 and N2) represents the failure current communication path in which the network node N1 is a starting point and the network node N2 is an end point.

The failure detected network node is positioned just after the lower stream side with respect to the failure location, and detects a failure according to disconnection (reception is disabled) of the optical signal.

The alternative communication path is predetermined so as to have one to one correspondence to the failure current communication path, and is a communication path in a switching destination at the time of the occurrence of the failure. The alternative communication path is expressed by the network node series.

For example, SP1 (N1, N4, N5, and N2) denotes the alternative communication path which passes the network node N1 as a starting point via the network nodes N4 and N5 to the network node N2 as an end point.

In the above example, when a failure occurs in the link L1 on the failure current communication path WP1, after the network node N2 detects the failure, the failure notification message is transmitted. The network nodes which receive the failure notification messages refer to the alternative communication path table TB so as to execute a process for switching the communication path from WP1 as the failure current communication path into SP1 as the alternative communication path.

With reference to FIG. 2, the message processor 56 refers to the failure location information included in the received new failure notification message and the alternative communication path table TB so as to determine whether the self network node is included in the alternative communication path. When it is included, the message processor 56 instructs the main controller 58 to switch the communication path.

When the self network node is included in the alternative communication path which is set when a failure occurs in the link LX, for example, the instruction includes a combination of a channel number of the input port and a channel number of the output port in the optical switch 51 necessary for setting the alternative communication path for the link LX.

The main controller 58 instructs a switch controller 59 to initially set the MEMS angle based on the switching instruction from the message processor 56. The switch controller 59 initially sets the mirror of the optical switch 51 to the MEMS angle. In this initial setting, the angle is only roughly adjusted.

The main controller 58 waits for a post of signal quality from the output side signal monitoring section 54 after the initial setting. When the optical signal from the upper stream side reaches the network node, the optical signal passes through the optical signal input section 50, the optical switch 51, and the optical signal output section 52.

At this time, the optical signal input section 50 posts the quality of the input optical signal as the input side signal quality to the main controller 58 via the input side signal monitoring section 53. Similarly, the output side signal monitoring section 54 posts the quality of the optical signal output from the optical signal output section 52 as the output side signal quality to the main controller 58.

When the input side signal quality has no abnormality and the output side signal quality has abnormality, the main controller 58 determines that the MEMS angle in the optical switch 51 is adjusted defectively, and instructs the switch controller 59 to finely adjust the MEMS angle.

Thereafter, the main controller 58 receives feedback of the output side signal quality from the output side signal monitoring section 54 and simultaneously executes feedback control for instructing the fine adjustment of the MEMS angle until an error of the output side signal quality is not detected.

The fine adjustment by the feedback control is successively executed in the network nodes from the switching network node on the upper stream side to the switching network node on the lower stream side. When the feedback control is not completed in all the network nodes, the alternative communication path (optical path) is not opened to traffic.

Further, when a failure occurs in the link linked with the optical signal input section 50, namely, when the input side signal quality from the input side signal monitoring section 53 has an error due to the disconnection of the optical signal or the like, the main controller 58 posts the error to the message processor 56.

The message processor 56 creates a failure notification message including information about the failure location in a link unit and the failure detected network node (self network node), and transmits the message to the message transmitter 57. The failure notification message is posted to another network node by flooding.

Figure 4:
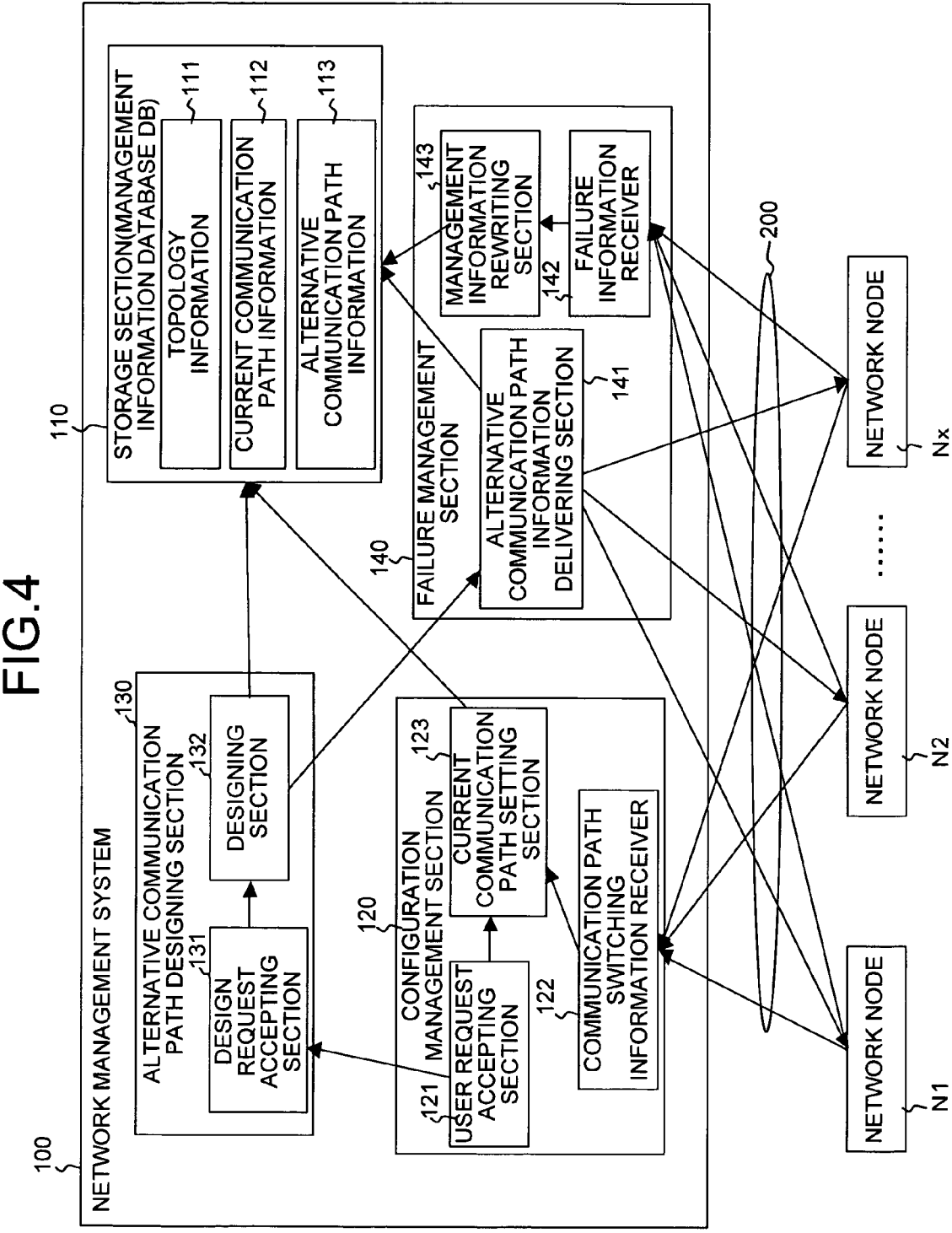
FIG. 4 is a block diagram illustrating a configuration of a network management system 100 illustrated in FIG. 1.

FIG. 4 is a block diagram illustrating a configuration of the network management system 100 illustrated in FIG. 1. In the drawing, the network management system 100 includes a storage section 110, a configuration management section 120, an alternative communication path designing section 130, and a failure management section 140.

The storage section 110 is provided with the management information database DB (see FIG. 1). Topologic information 111, current communication path information 112, and alternative communication path information 113 are stored into the management information database DB.

The topologic information 111 represents topology of the optical communication network NW (see FIG. 1) where the alternative communication path is subject to be designed. The topologic information 111 includes, as illustrated in FIG. 5, network node information 111A and link information 111B.

The network node information 111A relates to the network nodes configuring the optical communication network NW, and is information about the network nodes (N1 to Nx), latitudes of the network nodes, and longitudes of the network nodes. The link information 111B relates to a link which connects network nodes configuring the optical communication network NW, and is information about a link, one network node of the link, the other network node of the link, and a length of the link.

The current communication path information 112, as illustrated in FIG. 6, relates to the current communication path set on the optical communication network NW, and is information about the current communication paths (WP1 to WPx), the starting point network node of the current communication path, the end point network node of the current communication path, a route network node series present between the starting point network node and the end point network node, and a number of channels.

With reference to FIG. 4, the alternative communication path information 113 is stored into the alternative communication path table TB (see FIG. 3), and is about a failure location, a failure current communication path, an alternative communication path, and a failure detected network node.

The configuration management section 120 manages the configuration of the optical communication network NW (current communication path, and alternative communication path). In the configuration management section 120, a user request accepting section 121 accepts a setting request about the current communication path, the alternative communication path, and the like from a user.

When the communication path is switched from the current communication path into the alternative communication path at the time of the occurrence of a failure, a communication path switching information receiver 122 receives communication switching information from the network nodes N1 to Nx via the exclusive network 200.

A current communication path setting section 123 sets the current communication path based on the setting request from the user request accepting section 121, the topologic information 111, and the communication path switching information, so as to store the current communication path information 112 into the management information database DB.

The alternative communication path designing section 130 sets the alternative communication path. In the alternative communication path designing section 130, a designing request accepting section 131 accepts a setting request of the alternative communication path from the user request accepting section 121. A designing section 132 designs the alternative communication path based on logic, mentioned later, so that the failure posting time is shortened and the total auxiliary communication capacity (resource) is minimized. The designing section 132 stores the alternative communication path information into the management information database DB so as to transmit it to an alternative communication path information delivering section 141, mentioned later.

A failure management section 140 manages management information at the time of the occurrence of a failure. In the failure management section 140, an alternative communication path information delivering section 141 delivers the alternative communication path information 112 from the designing section 132 via the exclusive network 200 to the network nodes N1 to Nx.

A failure information receiver 142 receives failure information from the network nodes N1 to Nx. A management information rewriting section 143 rewrites the management information in the management information database DB based on the failure information received by the failure information receiver 142.

An operation of the embodiment is explained below.

The first alternative communication path designing process is explained with reference to the flowchart in FIG. 7, FIG. 8, and FIG. 9. FIG. 8 is a diagram explaining the first alternative communication path designing process, and represents topology TP of the optical communication network NW to be designed. The topology TP illustrated in FIG. 8 is supposed to be related with the optical communication network NW illustrated in FIG. 1.

When the user request accepting section 121 illustrated in FIG. 4 accepts a setting request of the alternative communication path, the designing request accepting section 131 of the alternative communication path designing section 130 accepts the setting request.

Figure 7:
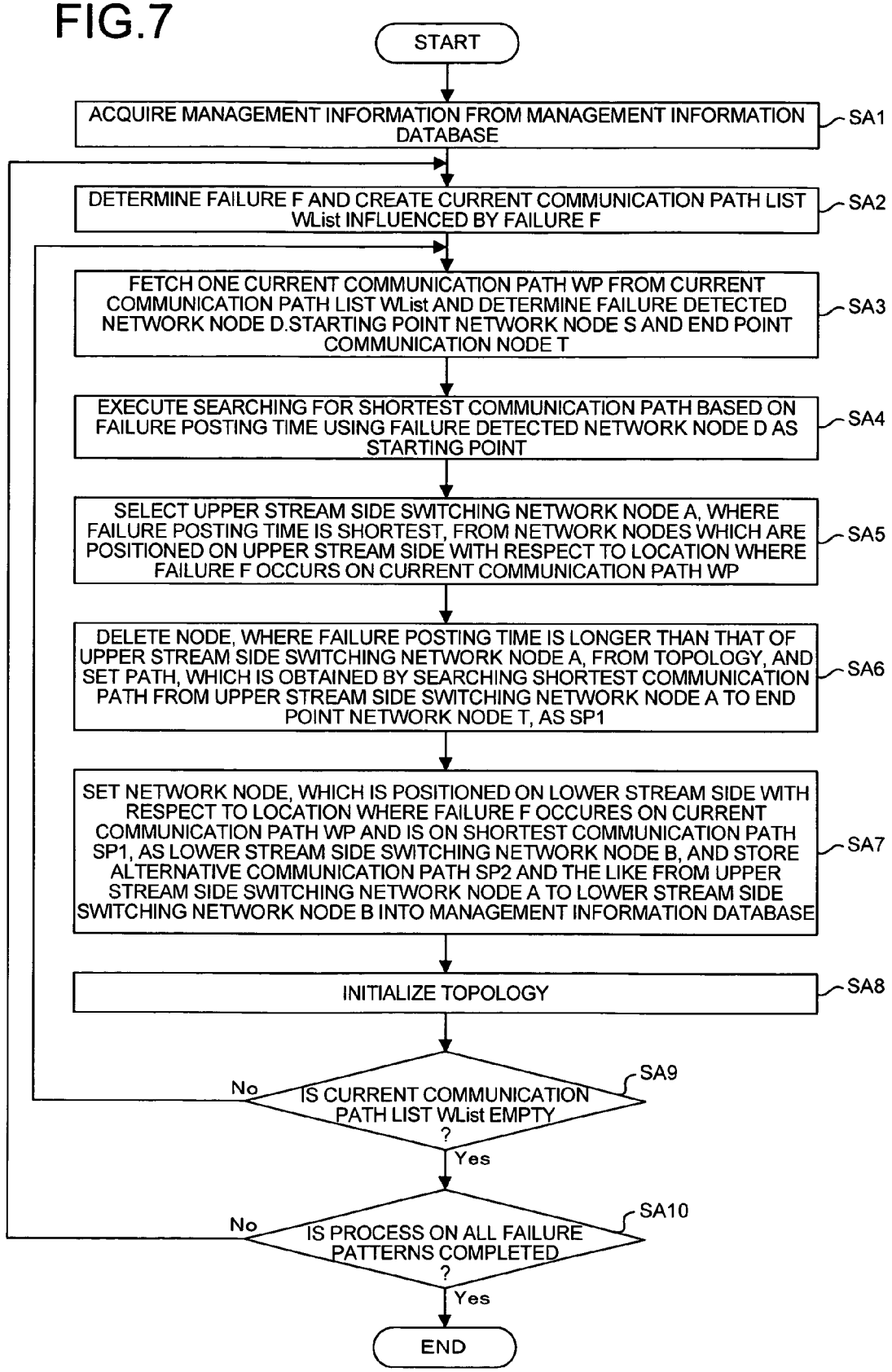
FIG. 7 is a flowchart explaining a first alternative communication path designing process.
Figure 8:
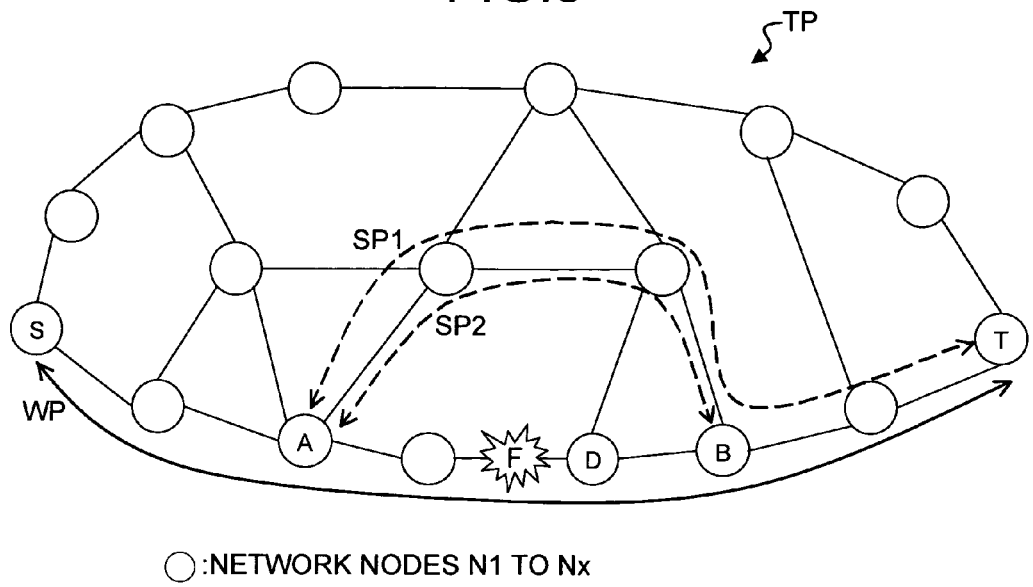
FIG. 8 is a diagram explaining the first alternative communication path designing process.

As a result, the designing section 132 executes the first alternative communication path designing process according to the flowchart illustrated in FIG. 7. Concretely, the designing section 132 acquires the management information (the topologic information 111 illustrated in FIG. 5, and the current communication path information 112 illustrated in FIG. 6) required for the designing from the management information database DB at step SA1. The topologic information 111 corresponds to the topology TP illustrated in FIG. 8.

The designing section 132 determines a failure F in an arbitrary link in the topology TP illustrated in FIG. 8 at step SA2. The designing section 132 refers to the current communication path information 112 illustrated in FIG. 6 so as to create a current communication path list WList relating to the current communication path including the location where the failure F has occurred.

The current communication path list WList includes WP1 (N1 and N2), WP2 (N1, N2, N3, and N6), WP3 (N1, N2, N5, and N8), WP4 (N9, N6, N3, N2, and N1), and WP5 (N2, N1, and N4) illustrated in FIG. 3.

The designing section 132 fetches one current communication path WP1 (N1 and N2) (in this case, the path at the head) from the current communication path list WList, and determines a failure detected network node D at step SA3.

The failure detected network node D is a network node on the current communication path WP1 (N1 and N2), and is a network node just after the lower stream side in the position of the failure F. The designing section 132 sets the starting point network node as S and the end point network node as T in the current communication path WP1.

The designing section 132 executes searching for shortest communication path represented by a publicly-known Dijkstra method or the like at step SA4 using a transfer time of the failure notification message (hereinafter, the failure posting time) transferred from the failure detected network node D to the network nodes at the time of detecting a failure as an index.

In order to calculate the failure posting time, a passing time of the failure notification message in the link and the network nodes is modeled.

Figure 9:
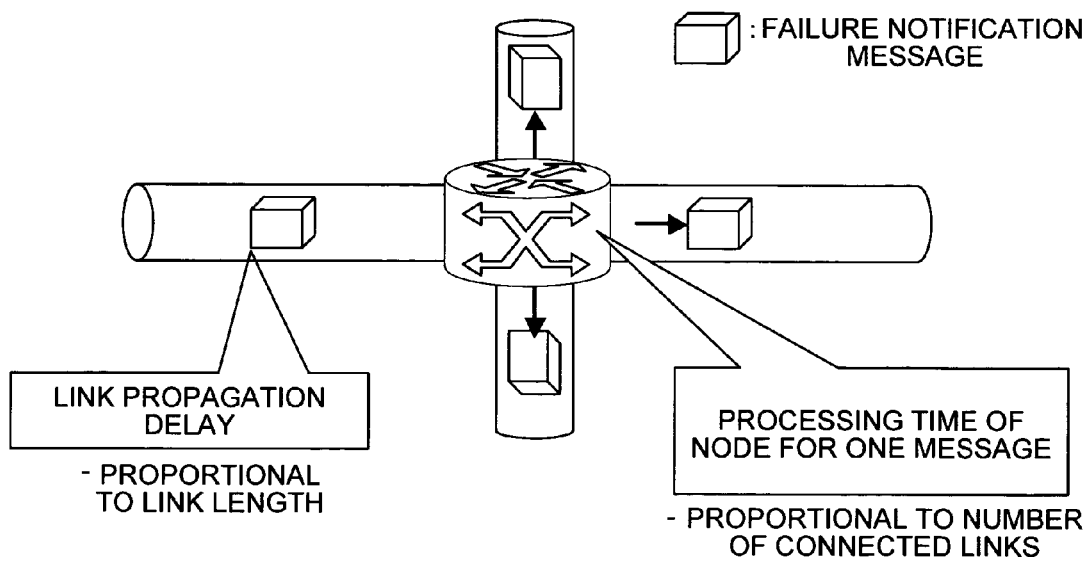
FIG. 9 is a diagram in which a passing time of a failure notification message in a link and a node is modeled.

FIG. 9 is one example of the modeling. When the failure notification message is transferred, a propagation time required for propagating the failure notification message in the link and a processing time of one failure notification message in the network nodes are taken into consideration.

A delay in propagation in the link is proportional to a link length. A proportionality constant of the delay in propagation is a physical transmission delay time of the optical communication (4.833e-6 sec/km)

The processing time in the network nodes is proportional to a number of connected links. The processing time takes a time for inputting/outputting the failure notification message into consideration, but the flooding order of the failure notification message at the time of the failure cannot be predicted. For this reason, the time takes the worst case into consideration.

That is to say, the time required for passing of the failure notification message through the network nodes is assumed to be processed last in any case. Since a total number of the message reception and transmission links is a number of links to be connected with the network nodes, the failure notification message processing time is set to be a value proportional to the number of the links. The proportionality constant at this time can be set according to a processing ability of a calculator of the message processor such as 0.5 millisecond.

In the network management system 100, the failure posting time is obtained as a sum of the propagation delay time and the processing time between the failure detected network node D and the network nodes. In the shortest communication path searching, the failure posting time from the failure detected network node D to the network nodes is obtained.

At step SA5, the designing section 132 selects a network node where the failure posting time is the shortest from the network nodes which are positioned on the upper stream side with respect to the location of the failure F on the current communication path WP (in this case, WP1) fetched at step SA3 based on the result of the shortest communication path searching. The selected network node is set as an upper side switching network node A.

The designing section 132 deletes network nodes, where the failure posting time is longer than that of the upper stream side switching network node A, from the topology TP at step SA6, and searches for the shortest communication path from the upper stream side switching network node A to the end point network node T on the topology TP. The shortest communication path obtained here is designated by SP1.

The designing section 132 sets a network node, which is positioned on the lower stream side on the current communication path WP with respect to the location where the failure F has occurred and is present on the shortest communication path SP1, as a lower stream side switching network node B at step SA7.

The designing section 132 stores the failure location corresponding to the failure F, the failure current communication path (current communication path WP), the alternative communication path SP2 from the upper stream side switching network node A to the lower stream side switching network node B, and the failure detected network node D as the alternative communication path information (see FIG. 3) into the management information database DB.

The designing section 132 initializes the topology at step SA8, and returns the network node deleted at step SA6. The designing section 132 determines whether the current communication path list WList is empty at step SA9, and in this case, the determined result is supposed to be "No". Thereafter, steps SA3 to SA9 are repeated so that the process relating to the current communication path WP is successively executed.

When the determined result at step SA9 is "Yes", the designing section 132 determines whether the process on all the failure patterns is completed at step SA10, and in this case, the determined result is supposed to be "No".

The locations where a failure has occurred are moved on the topology TP so that the above process is executed at steps SA2 to SA10. When the determined result at step SA10 is "Yes", the first alternative communication path designing process is ended.

The alternative communication path information delivering section 141 delivers the alternative communication path information 113 to the network nodes N1 to Nx via the exclusive network 200. As a result, in the network nodes N1 to Nx, as illustrated in FIG. 3, the alternative communication path information 113 is stored into the alternative communication path table TB.

Figure 10:
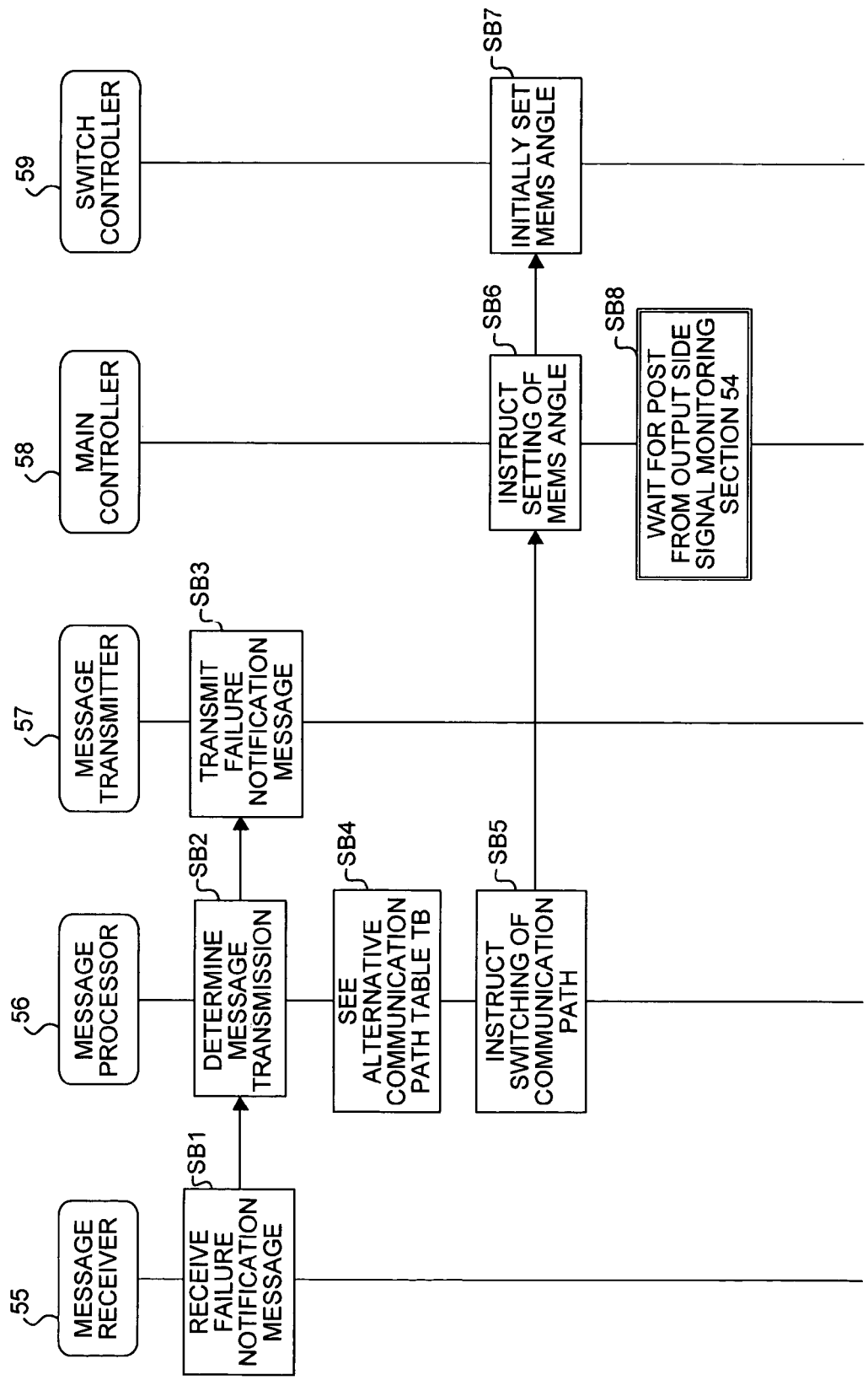
FIG. 10 is a sequence diagram explaining an operation of the network nodes N1 to Nx illustrated in FIGS. 1 and 2.
Figure 11:
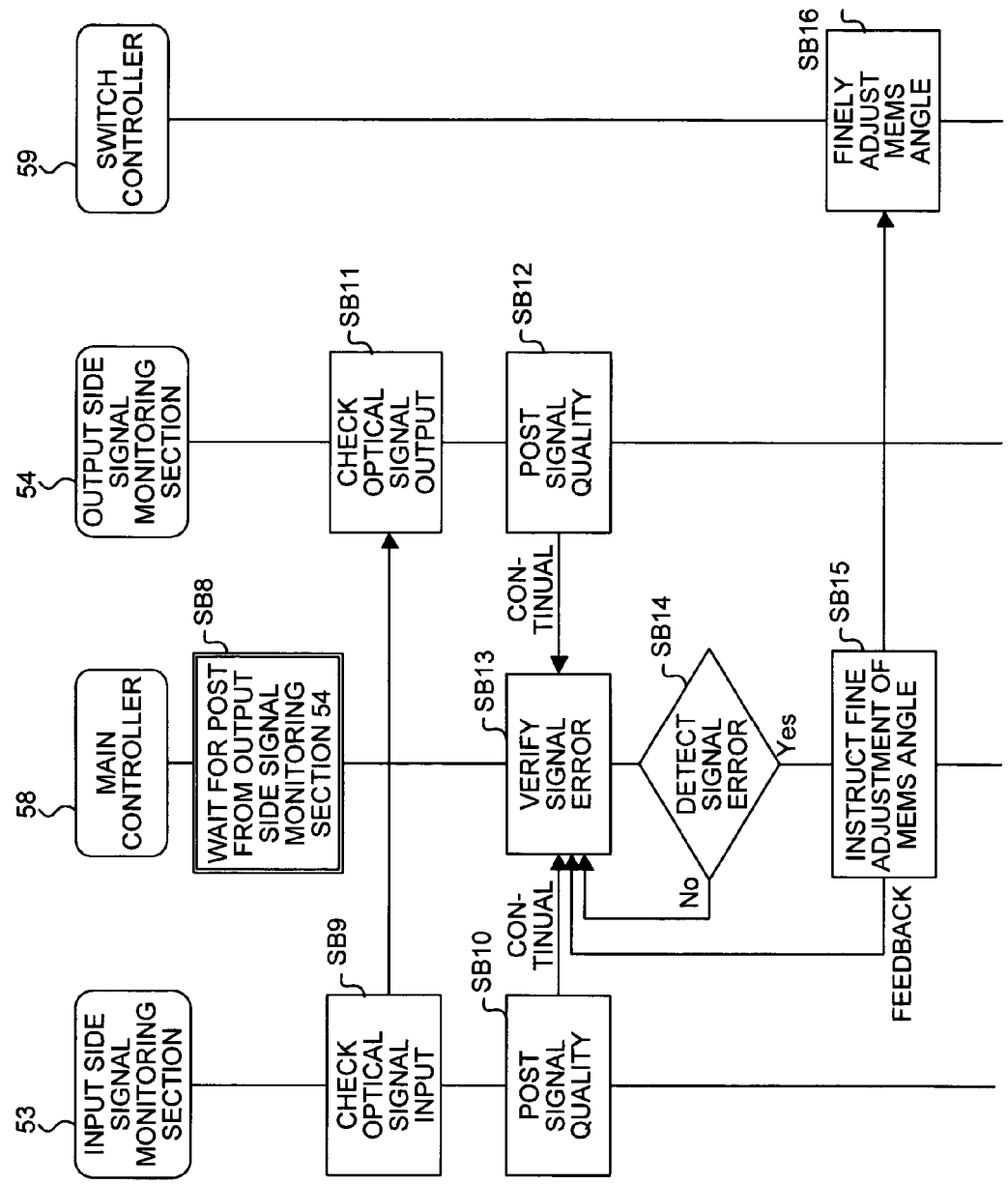
FIG. 11 is a sequence diagram explaining the operation of the network nodes N1 to Nx illustrated in FIGS. 1 and 2.

A switching operation when a failure occurs after the alternative communication path information is stored into the alternative communication path table TB (see FIG. 3) is explained below with reference to FIGS. 8, 10, and 11. FIGS. 10 and 11 are sequence diagrams explaining the operation of the network nodes N1 to Nx illustrated in FIGS. 1 and 2.

In this case, the communication is supposed to be executed in the current communication path WP (starting point network node s to end point network node T) illustrated in FIG. 8. When the failure F occurs, the failure detected network node D detects the failure. As a result, the failure detected network node D creates the failure notification message, and transmits it to another network node. Thereafter, the failure notification message is posted to other network nodes by means of flooding.

The message receiver 55 of another network node receives the failure notification message from an adjacent network node at step SB1 illustrated in FIG. 10. When the failure notification message received by the message receiver 55 is new, the message processor 56 holds it and determines whether it is transmitted to another adjacent network node at step SB2.

The message transmitter 57 transmits the failure notification message to the adjacent network node based on the transmission instruction from the message processor 56 at step SB3.

The message processor 56 refers to the alternative communication path table TB (see FIG. 3) at step SB4. The message processor 56 instructs the main controller 58 to switch the communication path at step SB5.

The main controller 58 instructs the switch controller 59 to initially set the MEMS angle based on the switching instruction from the message processor 56 at step SB6. The switch controller 59 initially sets the mirror of the optical switch 51 to the MEMS angle at step SB7. The main controller 58 waits for posting of the signal quality from the output side signal monitoring section 54 at step SB8 (see FIG. 11).

When the optical signal from the upper stream side reaches the network node, the optical signal passes through the optical signal input section 50, the optical switch 51, and the optical signal output section 52. That is to say, the input side signal monitoring section 53 checks that the optical signal is input into the optical signal input section 50 at step SB9 illustrated in FIG. 11. The input side signal monitoring section 53 posts the input side signal quality to the main controller 58 at step SB10.

The output side signal monitoring section 54 checks that the optical signal is output from the optical signal output section 52 at step SB11. The output side signal monitoring section 54 posts the output side signal quality to the main controller 58 at step SB12.

As a result, the main controller 58 verifies a signal error based on the input side signal quality and the output side signal quality at step SB13. The main controller 58 determines whether the signal error is detected at step SB14. When the determined result is "No", the process at step SB13 is executed continuously.

When the input side signal quality has no abnormality and the output side signal quality has abnormality, the main controller 58 determines that MEMS angle in the optical switch 51 is defectively adjusted, and the determined result at step SB14 is "Yes".

The main controller 58 instructs the switch controller 59 to finely adjust the MEMS angle at step SB15, so that the process at step SB13 is executed. The switch controller 59 finely adjusts the MEMS angle at step SB16.

The main controller 58 receives feedback of the output side signal quality from the output side signal monitoring section 54 and simultaneously executes feedback control such that the MEMS angle is finely adjusted until an error is not detected in the output side signal quality.

The fine adjustment by the feedback control is successively executed in the network nodes from the upper stream side switching network node A to the lower stream side switching network node B illustrated in FIG. 8. When the feedback control is completed in all the network nodes, the alternative communication path SP1 is opened to traffic.

The second alternative communication path designing process is explained below with reference to a flowchart illustrated in FIG. 12. In this drawing, a difference with FIG. 7 (the first alternative communication path designing process) is that the following conditions are set. An upper limit M of the failure posting time is set at step SC2, and when the upper stream side switching network node A is selected at step SC6, the failure posting time is not more than the upper limit M. The condition of the upper limit M is set, so that a flexible design standard can be applied.

Figure 12:
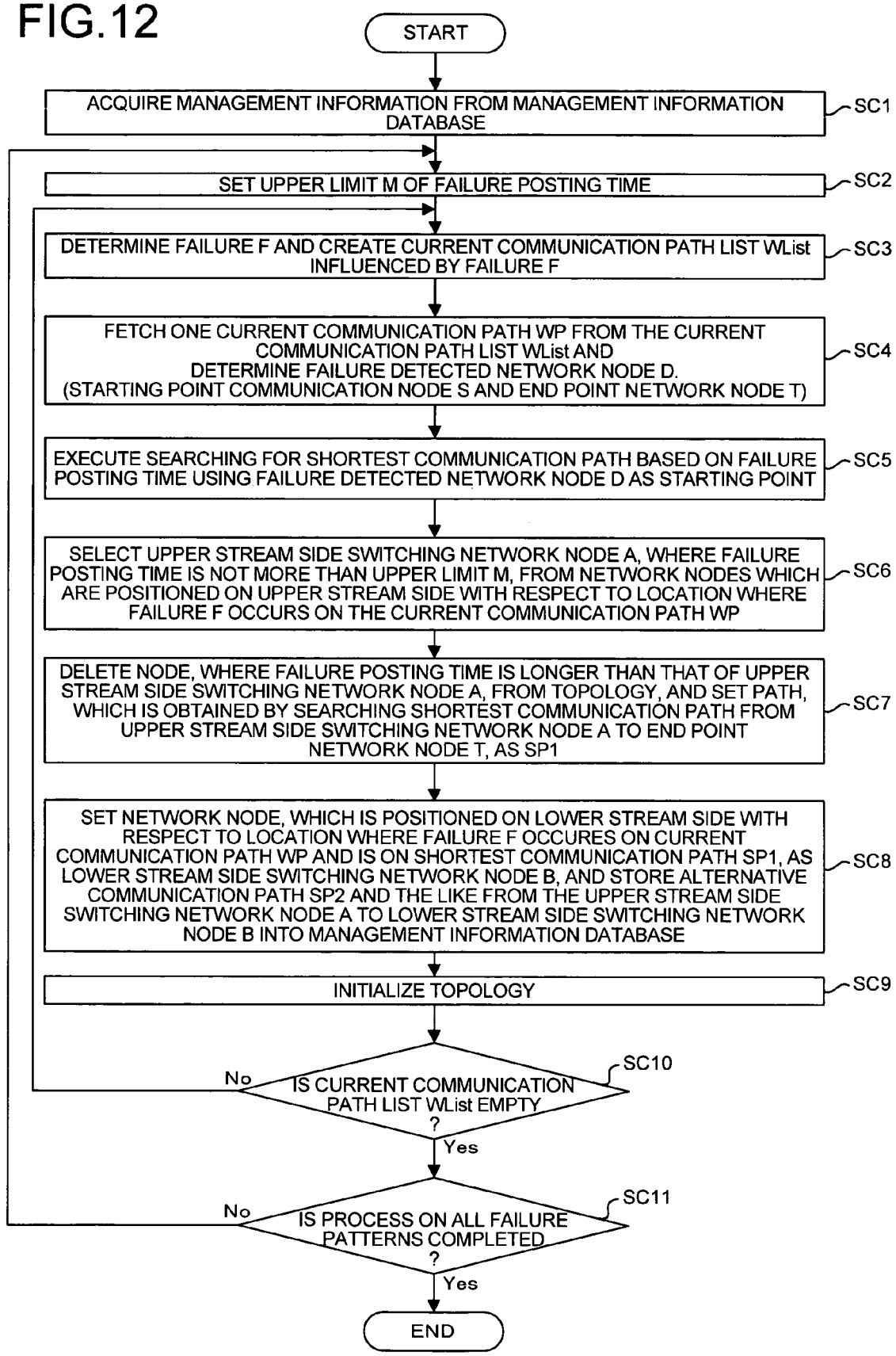
FIG. 12 is a flowchart explaining a second alternative communication path designing process.

The steps SC1, SC3 to SC5, and SC7 to SC11 illustrated in FIG. 12 correspond to steps SA1 to SA10 illustrated in FIG. 7.

Figure 13:
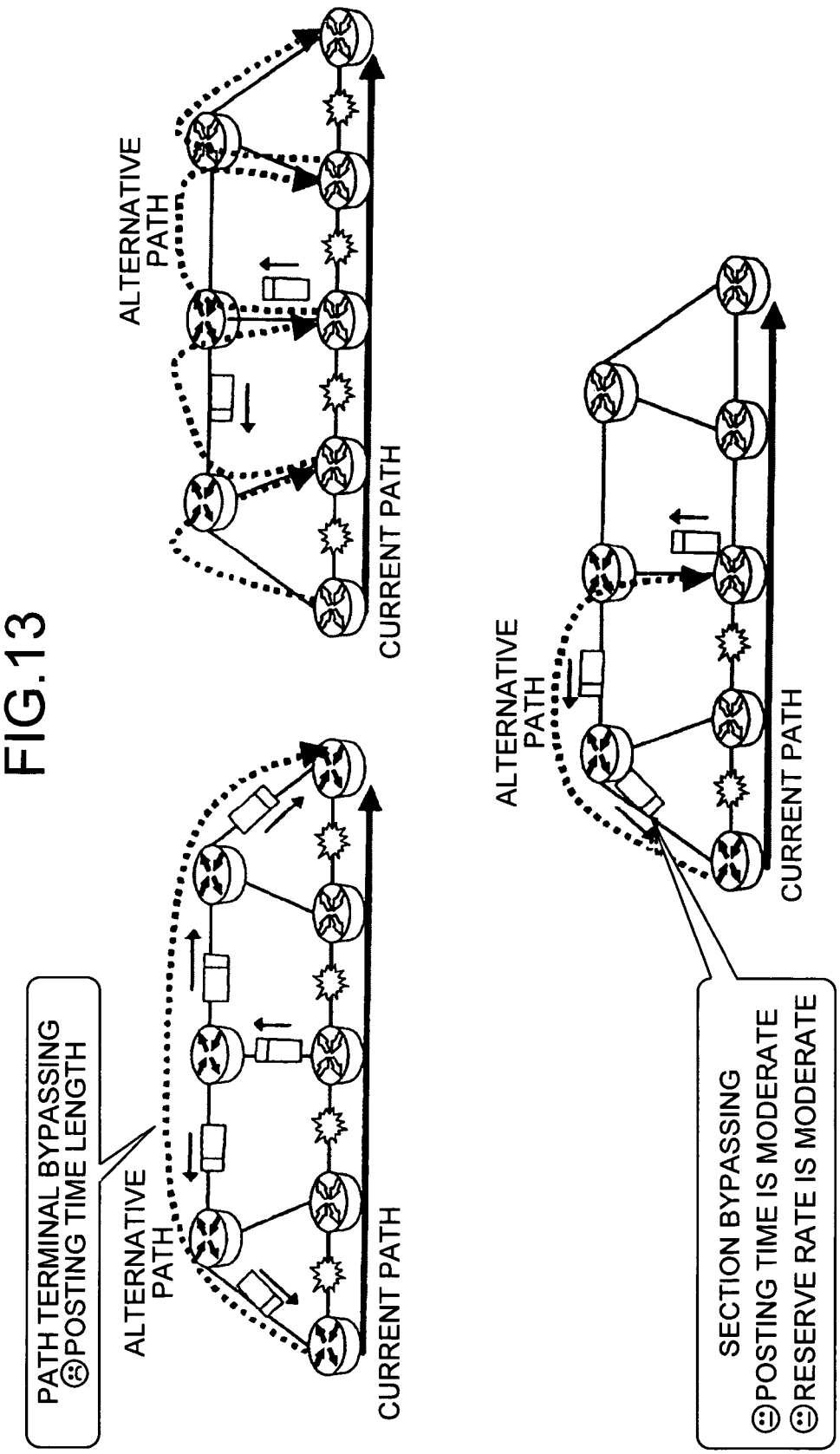
FIG. 13 is a diagram explaining a reason for introducing an upper limit M of the failure posting time at steps SC2 and SC6 illustrated in FIG. 12.

A reason for introducing the upper limit M of the failure posting time at steps SC2 and SC6 illustrated in FIG. 12 is explained with reference to FIG. 13. In general, a reserve rate (a ratio of the auxiliary communication capacity to the current communication capacity) at the time of path terminal bypassing can be set to be lower than that at the time of failure terminal bypassing. Since the upper stream side switching network node A where the failure posting time is the shortest is selected at step SA5 illustrated in FIG. 7, the alternative communication path which is close to the failure terminal bypassing is designed.

On the contrary, when the upper limit M is provided to the failure posting time and the upper stream side switching network node A is selected within a range not more than the upper limit M like at steps SC2 and SC6 illustrated in FIG. 12, a degree of freedom in selection of the alternative communication path increases, the alternative communication path in which the failure posting time balances with the reserve rate like section bypassing can be designed.

The third alternative communication path designing process is explained with reference to the flowchart illustrated in FIG. 14. In the drawing, a difference with FIG. 7 (the first alternative communication path designing process) is that when the topology is changed at step SD6, not only network nodes where the failure posting time is longer than that of the upper stream side switching network node A but also links where the auxiliary communication capacity (resource) cannot be shared with another failure are deleted. In this case, the recovery time can be shortened and the communication capacity can be used efficiently at the same time.

Figure 14:
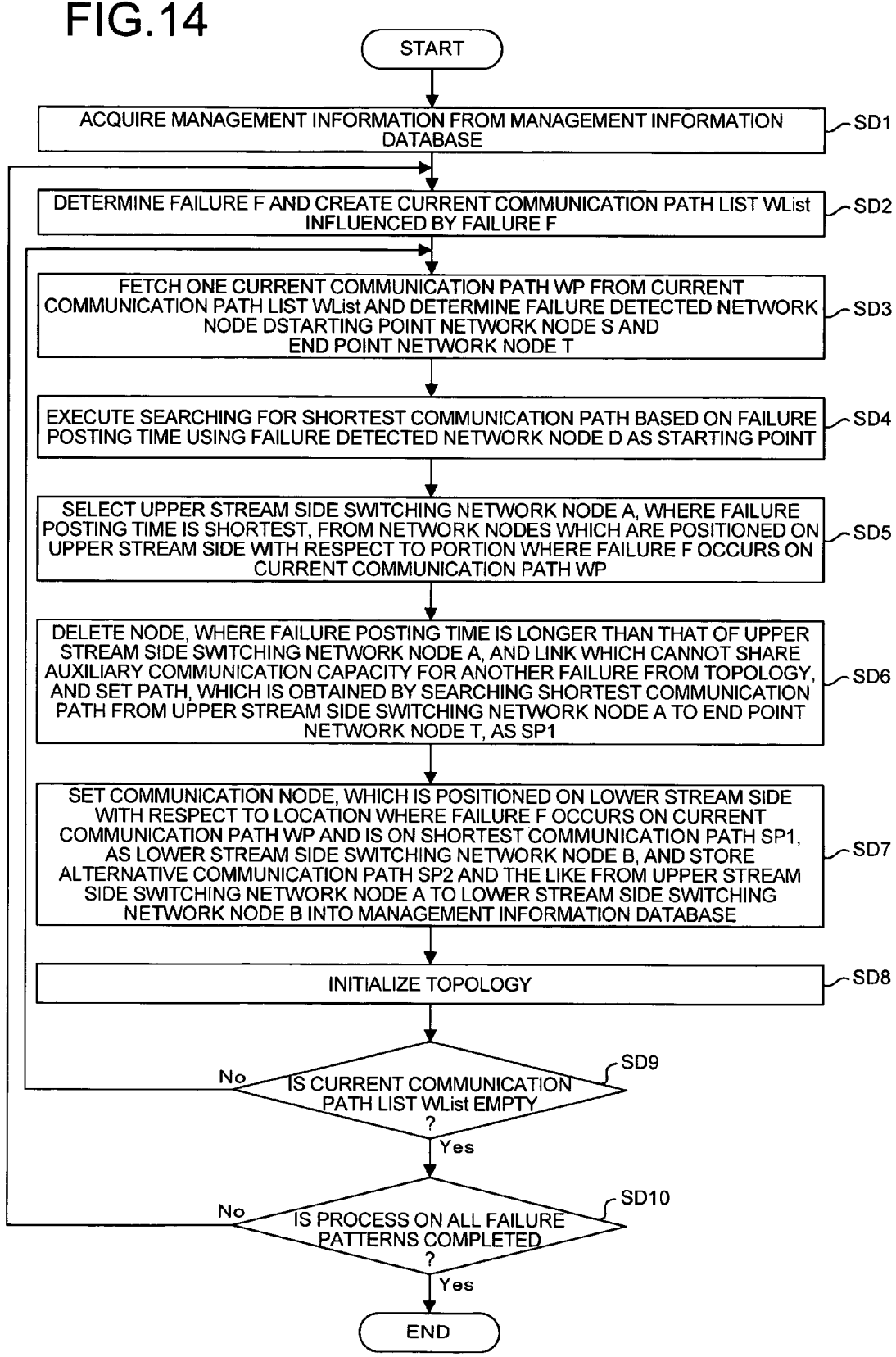
FIG. 14 is a flowchart explaining a third alternative communication path designing process.

The above-mentioned point is taken into consideration, and steps SD1 to SD10 illustrated in FIG. 14 correspond to steps SA1 to SA10 illustrated in FIG. 7.

Figure 15:
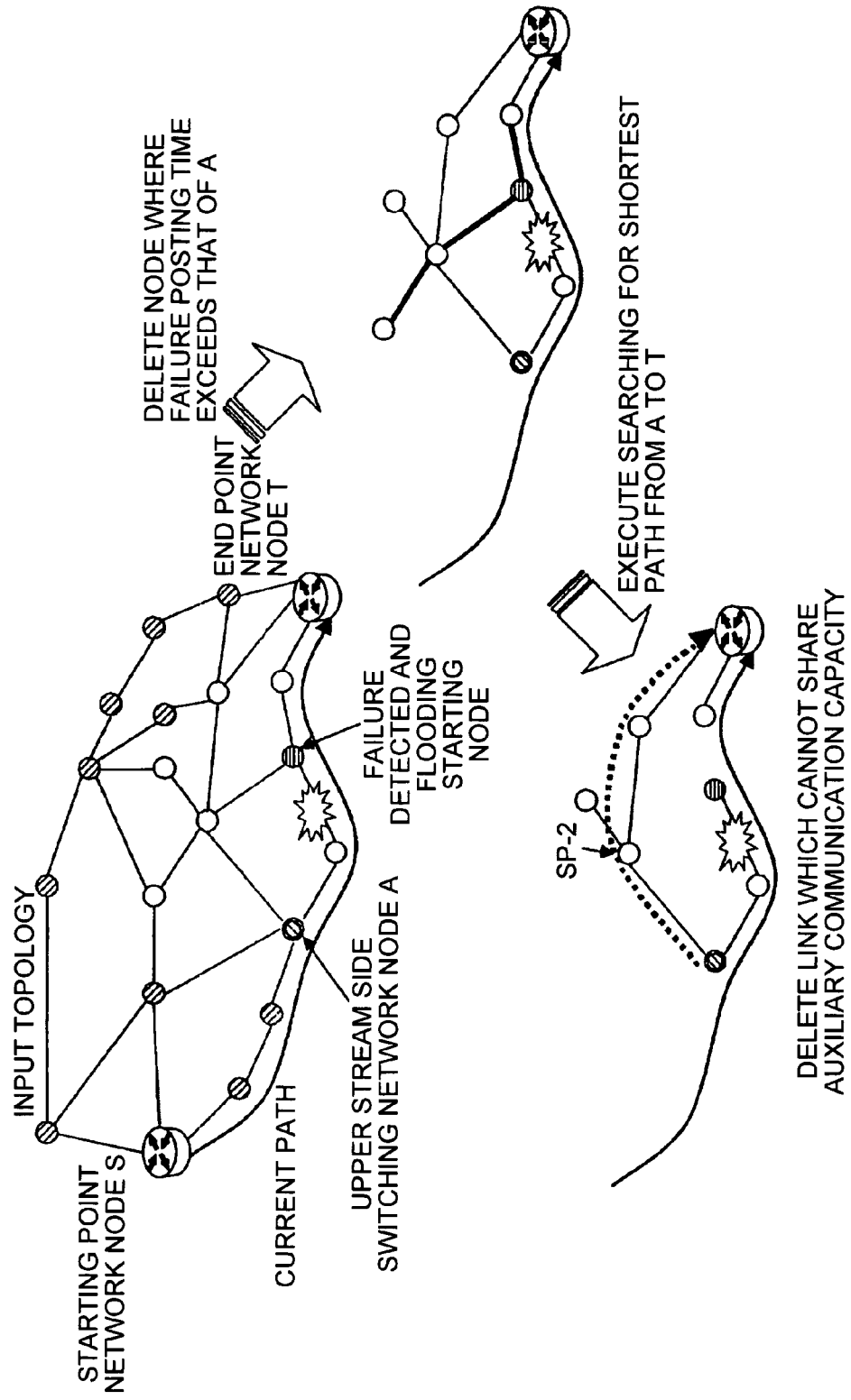
FIG. 15 is a diagram explaining a reason for deleting a link which cannot share an auxiliary communication capacity for another failure from the topology at step SD6 illustrated in FIG. 14.

A reason for deleting the links where the auxiliary communication capacity (resource) cannot be shared with another failure at step SD6 illustrated in FIG. 14 is explained with reference to FIG. 15. Network nodes, where the failure posting time exceeds that of the upper stream side switching network node A, are deleted from input topology. Thereafter, when the shortest communication path is searched on the topology from which the link whose auxiliary communication capacity (resource) cannot be shared with another failure is deleted, a calculating time can be shortened remarkably.

Figure 16:
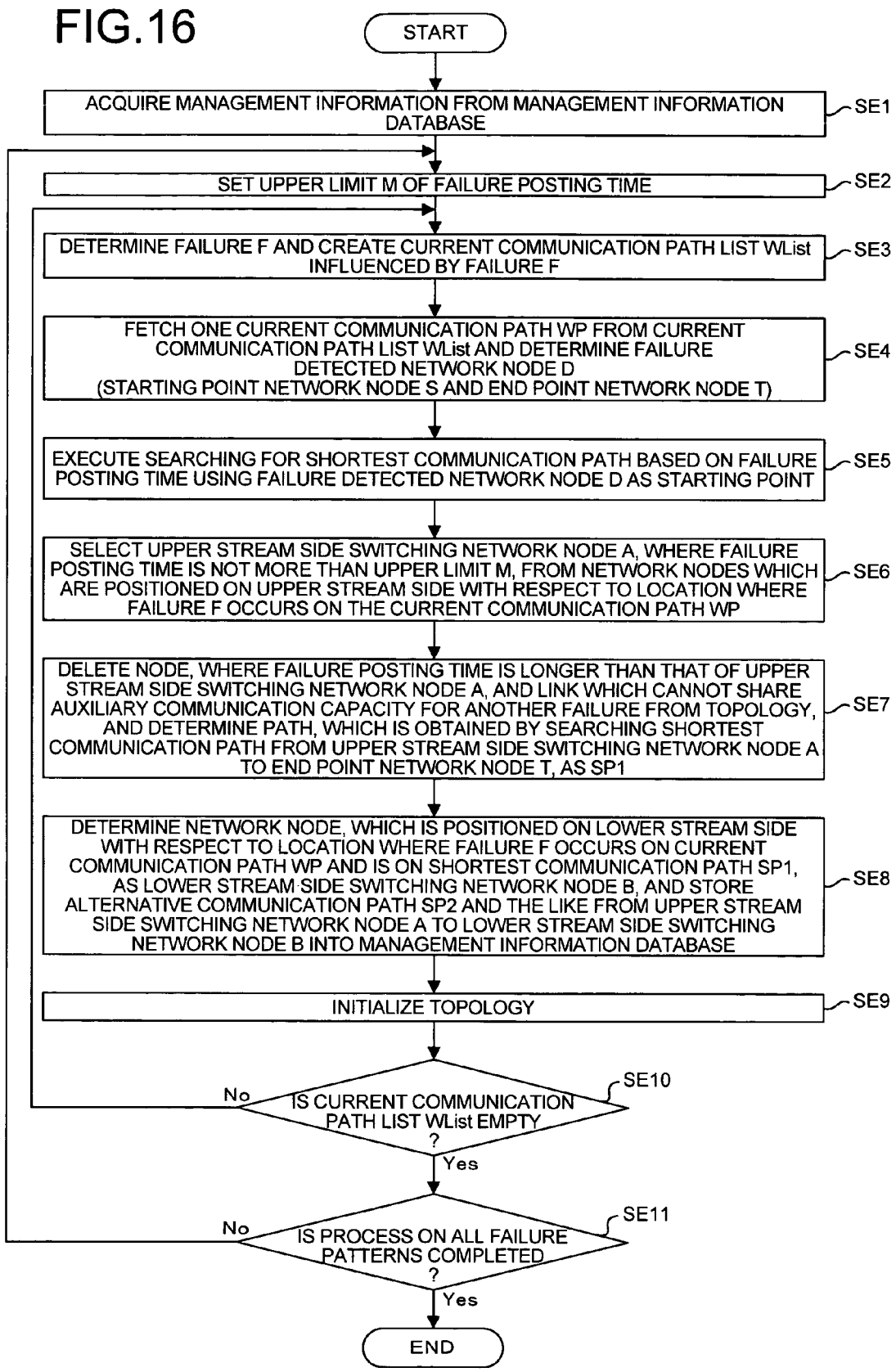
FIG. 16 is a flowchart explaining a fourth alternative communication path designing process.

The fourth alternative communication path designing process is explained with reference to a flowchart illustrated in FIG. 16. The fourth alternative communication path designing process includes a combination of the second alternative communication path designing process and the third alternative communication path designing process.

In this drawing, a difference with FIG. 7 (the first alternative communication path designing process) is that the upper limit M of the failure posting time is set at step SE2, and a condition such that when the upper stream side switching network node A is selected at step SE6, the failure posting time is not more than the upper limit M is imposed. Further, the difference is such that when the topology is changed at step SE7, not only the network nodes where the failure posting time is longer than that of the upper stream side switching network node A but also the links where the auxiliary communication capacity (resource) cannot be shared with another failure are deleted. In this case, the flexible design standard can be applied, and the recovery time can be shorted and the communication capacity (resource) can be used efficiently at the same time.

Figure 17:
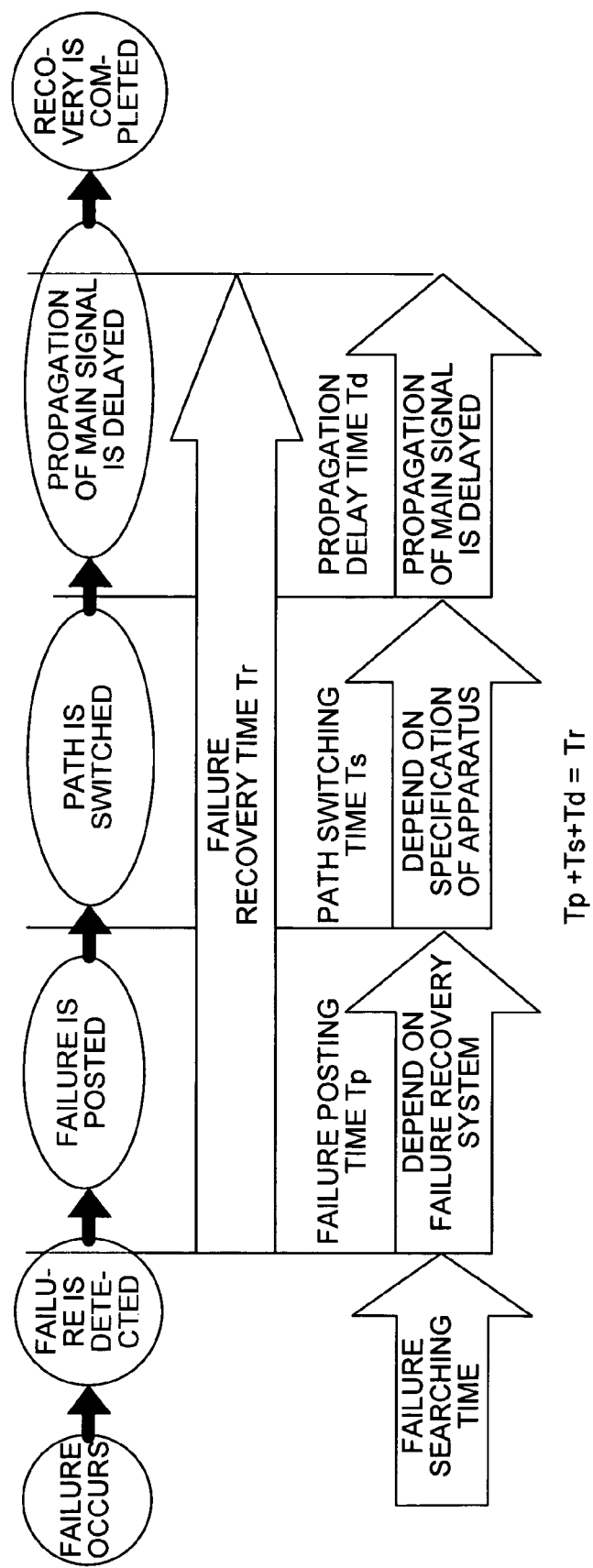
FIG. 17 is a diagram explaining a calculating method of a failure recovery time according to the embodiment.

In the network management system 100 according to one embodiment, as illustrated in FIG. 17, the failure recovery time required for from the detection of a failure to the recovery from the failure is calculated. In the drawing, a failure recovery time Tr is calculated based on a sum of a failure posting time Tp by means of flooding, a path switching time Ts depending on use of an apparatus by the network nodes, and a propagation delay time Td of a main signal (optical signal). As a result, more accurate failure recovery time Tr can be obtained. The failure posting time Tp is calculated from the propagation delay in the link illustrated in FIG. 9 and the message processing time of the network nodes. The propagation delay time Td of the main signal (optical signal) is calculated from the propagation delay in the link illustrated in FIG. 9.

According to one embodiment, as illustrated in FIG. 8, the network node (the upper stream side switching network node A), where the time for transferring the failure notification, message from the failure detected network node D is the shortest, is selected from the network nodes which are positioned in the upper stream side with respect to the location of the failure F on the current communication path WP. The alternative communication path SP2, which includes the network nodes whose failure posting time does not exceed that of the upper stream side switching network node A, is searched. For this reason, the upper stream side switching network node A is switched quickly, and the recovery time of the communication path can be shorted more realistically at the time of the occurrence of failure.

One embodiment according to the present invention is explained above with reference to the drawings, but the concrete configurational example is not limited to this embodiment. Changes in design are intended to be embraced in the present invention without deviating from the scope of the present invention.

Figure 18:
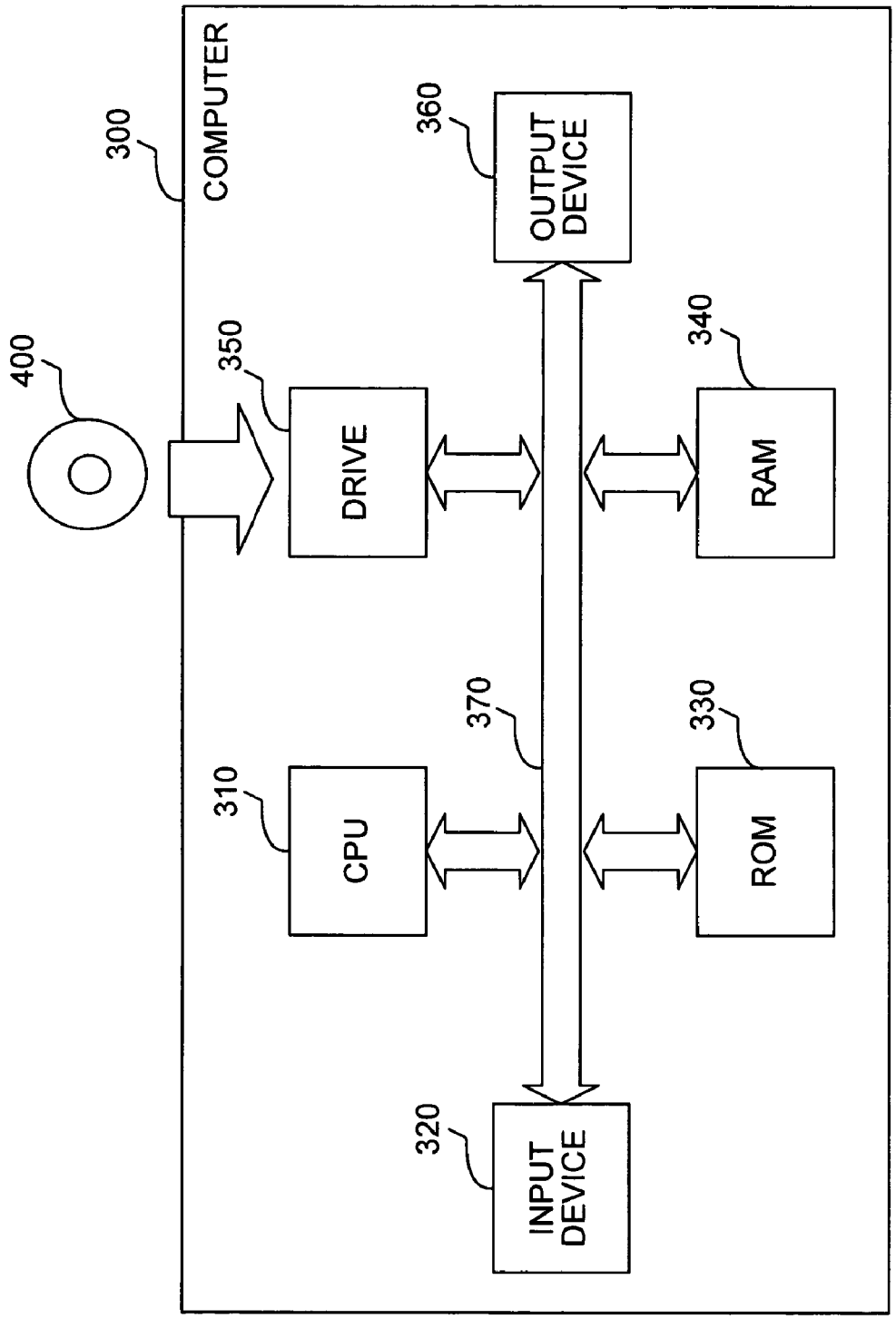
FIG. 18 is a block diagram illustrating a configuration of a modified example according to the embodiment.
Figure 19:
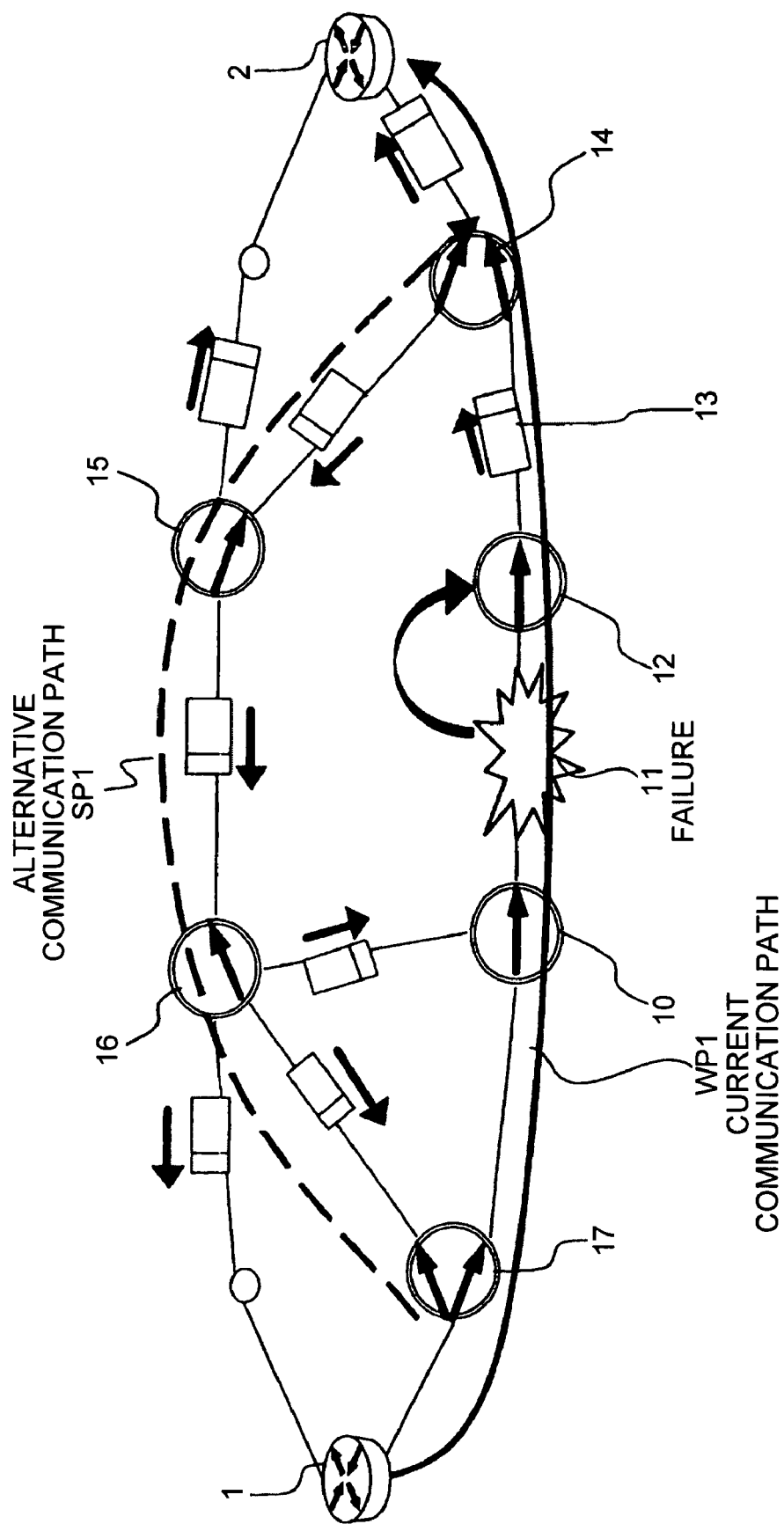
FIG. 19 is a diagram explaining a conventional preplan type failure recovery system.

For example, in the embodiment, a program for implementing the functions of the network management system 100 is recorded into a recording medium 400 readable by a computer illustrated in FIG. 18, the program recorded in the recording medium 400 is read into a computer 300 illustrated in the drawing and is executed so that the functions may be implemented.

The computer 300 illustrated in the drawing includes a central processing unit (hereinafter, "CPU") 310 that executes the program, an input device 320 such as a keyboard and a mouse, a read only memory (ROM) 330 which stores various pieces of data thereinto, a random access memory (RAM) 340 which stores operation parameters or the like thereinto, a drive 350 that reads the program from the recording medium 400, an output device 360 such as a display or a printer, and a bus 370 which connects the devices.

The CPU 310 reads the program recorded in the recording medium 400 via the drive 350, and executes the program so as to implement the functions. The recording medium 400 includes an optical disk, a flexible disk, a hard disk, and the like.

According to the present invention, the network node N, where the time for transferring the failure notification message from the failure detected network node is the shortest, is selected from the network nodes which are positioned on the upper stream side with respect to the failure location on the current communication path. The alternative communication path which is configured by the network nodes whose failure posting time does not exceed the time for posting the failure to the network node N, is searched. As a result, the network nodes on the upper stream side are switched quickly, and the recovery time of the communication path can be shortened more realistically at the time of the occurrence of the failure.

The network node N, where the time for transferring the failure notification message from the failure detected network node is within the given upper limit, is selected from the network nodes which are positioned on the upper stream side with respect to the failure location on the current communication path. For this reason, a flexible design standard can be applied.

The network node N, where the time for transferring the failure notification message from the failure detected network node is the shortest, is selected from the network nodes which are positioned on the upper stream side with respect to the failure location on the current communication path. The alternative communication path, which is configured by the network nodes whose failure posting time does not exceed the time for posting the failure to the network node N and can share the auxiliary communication capacity with another different failure, is searched. As a result, the recovery time can be shortened and simultaneously the communication capacity can be used efficiently.

The network node N, where the time for transferring the failure notification message from the failure detected network node is within the given upper limit, is selected from the network nodes which are positioned on the upper stream side with respect to the failure location on the current communication path. The alternative communication path, which is configured by the network nodes whose failure posting time does not exceed the time for posting the failure to the network node and can share the auxiliary communication capacity with another different failure, is searched. As a result, a flexible design standard can be applied, and the recovery time can be shortened and simultaneously the communication capacity can be used efficiently.

The recovery time of the communication path is calculated based on the sum of the time for posting the failure to the network node N, the switching time of the network nodes, and the propagation delay of a signal. For this reason, more accurate recovery time can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of determining an alternative communication path in a communication network built with a plurality of network nodes, comprising:

assuming that a network failure occurs at a location in a current communication path, the current communication path being a single path connecting a plurality of path network nodes in a row, the path network nodes being nodes included in the network nodes, the path network nodes being divided into first path network nodes and second path network nodes, the first path network nodes being nodes that are located on upper stream of the current communication path from the location of the network failure, and the second path network nodes being nodes that are located on down stream of the current communication path from the location of the network failure;

determining a failure detected network node that detects the network failure, out of the path network nodes;

calculating a failure notification time for each network node, the failure notification time indicating a time from when a failure notification message is transmitted by the failure detected network node until the each network node receives the failure notification message;

selecting a first network node based on the failure notification time, out of the first path network nodes that are positioned in the current communication path on the upper stream from the location of the network failure; and determining an alternative communication path that includes the first network node and a second network node out of the second path network nodes with a network node having the failure notification time longer than the failure notification time of the first network node excluded from network nodes forming the alternative communication path, the second network node being positioned in the current communication path on the down stream from the location of the network failure.

2. The method according to claim 1, wherein the failure notification time of the first network node is the shortest of the network nodes that are positioned on upper stream from the location of the network failure.

3. The method according to claim 1, wherein the failure notification time of the first network node is smaller than a predetermined time.

4. The method according to claim 1, wherein the alternative communication path allows to share an auxiliary communication capacity for other network failure.

5. The method according to claim 1, wherein the failure notification time is calculated as a sum of a propagation delay time of a communication link between the network nodes and a processing time for inputting/outputting the failure notification message in the each network node.

6. The method according to claim 1, further comprising calculating a recovery time of the communication path as a sum of the failure notification time of the first network node, a switching time of each network node on the alternative communication path, and a propagation delay of a signal to be transferred.

7. An apparatus for determining an alternative communication path in a communication network built with a plurality of network nodes, comprising:

a node selecting unit that determines a failure detected network node that detects a network failure that is assumed to occur at a location in a current communication path, the current communication path being a single path connecting a plurality of path network nodes in a row, the path network nodes being nodes included in the network nodes, the path network nodes being divided into first path network nodes and second path network nodes, the first path network nodes being nodes that are located on upper stream of the current communication path from the location of the network failure, and the second path network nodes being nodes that are located on down stream of the current communication path from the location of the network failure, out of the path network nodes, calculates a failure notification time for each network node, the failure notification time indicating a time from when a failure notification message is transmitted by the failure detected network node until the each network node receives the failure notification message, and selects a first network node based on the failure notification time, out of the first path network nodes that are positioned in the current communication path on the upper stream from the location of the network failure; and a path searching unit that determines an alternative communication path after the node selecting unit selects the first network node, the alternative communication path including the first network node and a second network node out of the second path network nodes and the alternative communication path excluding a network node having the failure notification time longer than the failure notification time of the first network node from network nodes forming the alternative communication path, and the second network node being positioned in the current communication path on the down stream from the location of the network failure.

8. The apparatus according to claim 7, wherein the failure notification time of the first network node is the shortest of the network nodes that are positioned on upper stream from the location of the network failure.

9. The apparatus according to claim 7, wherein the failure notification time of the first network node is smaller than a predetermined time.

10. The apparatus according to claim 7, wherein the alternative communication path allows to share an auxiliary communication capacity for other network failure.

11. The apparatus according to claim 7, wherein the failure notification time is calculated as a sum of a propagation delay time of a communication link between the network nodes and a processing time for inputting/outputting the failure notification message in the each network node.

12. The apparatus according to claim 7, further comprising a calculating unit that calculates a recovery time of the communication path as a sum of the failure notification time of the first network node, a switching time of each network node on the alternative communication path, and a propagation delay of a signal to be transferred.

13. A computer program product for realizing a method of determining an alternative communication path in a communication network built with a plurality of network nodes, including computer executable instructions stored on a computer readable medium, wherein the instructions, when executed by the computer, cause the computer to perform:

assuming that a network failure occurs at a location in a current communication path, the current communication path being a single path connecting a plurality of path network nodes in a row, the path network nodes being nodes included in the network nodes, the path network nodes being divided into first path network nodes and second path network nodes, the first path network nodes being nodes that are located on upper stream of the current communication path from the location of the network failure, and the second path network nodes being nodes that are located on down stream of the current communication path from the location of the network failure;

determining a failure detected network node that detects the network failure, out of the path network nodes;

calculating a failure notification time for each network node, the failure notification time indicating a time from when a failure notification message is transmitted by the failure detected network node until the each network node receives the failure notification message;

selecting a first network node based on the failure notification time, out of the first path network nodes positioned in the current communication path on the upper stream from the location of the network failure; and determining an alternative communication path that includes the first network node and a second network node out of the second path network nodes with a network node having the failure notification time longer than the failure notification time of the first network node excluded from network nodes forming the alternative communication path, the second network node being positioned in the current communication path on the down stream from the location of the network failure.

14. The computer program product according to claim 13, wherein the failure notification time of the first network node is the shortest of the network nodes that are positioned on upper stream from the location of the network failure.

15. The computer program product according to claim 13, wherein the failure notification time of the first network node is smaller than a predetermined time.

16. The computer program product according to claim 13, wherein the alternative communication path allows to share an auxiliary communication capacity for other network failure.

17. The computer program product according to claim 13, wherein the failure notification time is calculated as a sum of a propagation delay time of a communication link between the network nodes and a processing time for inputting/outputting the failure notification message in the each network node.

18. The computer program product according to claim 13, further comprising calculating a recovery time of the communication path as a sum of the failure notification time of the first network node, a switching time of each network node on the alternative communication path, and a propagation delay of a signal to be transferred.

* * * * *